(12) United States Patent
Childers et al.

(10) Patent No.: US 9,276,679 B2
(45) Date of Patent: *Mar. 1, 2016

(54) INSERT-MOLDED TRANSCEIVER BODY WITH HEAT SINK AND METHOD THEREFOR

(71) Applicant: US Conec, Ltd, Hickory, NC (US)

(72) Inventors: Darrell R. Childers, Hickory, NC (US); Russell Granger, Vale, NC (US); Myron Yount, Conover, NC (US)

(73) Assignee: U.S. Conec, Ltd., Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/475,518

(22) Filed: Sep. 2, 2014

(65) Prior Publication Data
US 2014/0376923 A1 Dec. 25, 2014

Related U.S. Application Data

(63) Continuation of application No. 13/050,278, filed on Mar. 17, 2011, now Pat. No. 8,852,716.

(60) Provisional application No. 61/315,385, filed on Mar. 18, 2010.

(51) Int. Cl.
| | | |
|---|---|---|
| *B32B 3/24* | (2006.01) | |
| *H04B 10/40* | (2013.01) | |
| *B29C 45/00* | (2006.01) | |
| *B29C 45/14* | (2006.01) | |
| *G02B 6/42* | (2006.01) | |
| *B29L 11/00* | (2006.01) | |
| *B29K 705/00* | (2006.01) | |

(52) U.S. Cl.
CPC ............ *H04B 10/40* (2013.01); *B29C 45/0025* (2013.01); *B29C 45/14336* (2013.01); *B29C 45/14467* (2013.01); *G02B 6/4246* (2013.01); *B29C 45/14778* (2013.01); *B29C 2045/0036* (2013.01); *B29K 2705/00* (2013.01); *B29L 2011/0075* (2013.01); *G02B 6/4255* (2013.01); *G02B 6/4269* (2013.01); *Y10T 428/18* (2015.01); *Y10T 428/19* (2015.01); *Y10T 428/24273* (2015.01); *Y10T 428/24331* (2015.01)

(58) Field of Classification Search
CPC .......... B29C 45/14467; G02B 6/4246; H04B 10/40; Y10T 428/24331; Y10T 428/24273
See application file for complete search history.

(56) References Cited

U.S. PATENT DOCUMENTS

| | | |
|---|---|---|
| 7,070,340 B2 | 7/2006 | Crane, Jr. et al. |
| 2003/0209829 A1 | 11/2003 | Brown, Jr. et al. |
| 2011/0229678 A1 | 9/2011 | Childers et al. |

*Primary Examiner* — William P Watkins, III
(74) *Attorney, Agent, or Firm* — Michael L. Leetzow, P.A.

(57) ABSTRACT

An insert-molded fiber optic transmission component has at least one insert and a main body portion. The main body portion has at least one adjoining surface, a portion of the at least one adjoining surface lying in a first plane. The insert has an engaging face disposed against the outer edge surface and a reference surface adjacent the engaging face, where the reference surface lies in a second plane, and the adjoining surface is adjacent the engaging face of the at least one insert and the first and second planes being parallel to and offset from one another.

14 Claims, 14 Drawing Sheets

INSERT-MOLDED TRANSCEIVER BODY WITH HEAT SINK AND METHOD THEREFOR

REFERENCE TO RELATED CASE

This application is a continuation application of and claims priority to U.S. patent application Ser. No. 13/050,278 and also claims priority under 35 U.S.C. §119(e) to provisional application No. 61/315,385, filed on Mar. 18, 2010, which are hereby incorporated by reference in their entirety.

BACKGROUND OF THE INVENTION

Field of the Invention

A new design for an insert-molded transceiver body having metal heat sinks molded therein has fewer surfaces to seal, thereby preventing flash on the molded part. In particular, the transceiver body and its mold has a shut-off portion against the heat sinks to prevent flash during the molding process.

During the process of injection molding, a cavity is created for the plastic to fill. The cavity of the mold is closed and the filled with a polymer. If the cavity area is not adequately sealed, a thin web of polymer material will leak past the desired cavity area, resulting in flash. Flash is undesirable on parts as it can break off and cause debris problems or cause the injection molded part to be larger than the dimensions allowed. Some small gaps in the closed mold are permissible, but the size of those gaps that do not cause flash are dependent on the viscosity of the polymer.

Sometimes it is necessary to mold a polymer with an insert or component encapsulating (or being incapsulated by) the polymer. This is usually called insert-molding. The inserts are often made of metal, ceramics, or another polymer. To insert-mold a component, the mold cavity closes around the insert and the cavity is sealed around the insert. However, depending on the location of the insert within the molded piece (and therefore within the cavity), the tolerances of the insert may create gaps in the mold that are large enough to create flash. This may be even more prevalent when the insert is along one edge of the mold cavity. Thus, it may be difficult to insert-mold those inserts that are along an edge, and even more difficult when the insert forms one boundary of the insert-molded piece. When the insert forms one side of the insert-molded piece, the mold needs to seal against at least four sides (or surfaces) of the insert, and maybe more depending on the complexity of the piece. Thus, the mold needs to be designed to seal against those multiple surfaces of the insert. Typically, however, the insert used in the mold is not always perfect and has tolerances in its dimensions. This means that the insert may not exactly fit the mold and allow for gaps in the molding process, which leads to undesirable flash.

SUMMARY OF THE INVENTION

The present invention is directed to an insert-molded fiber optic transmission component having at least one insert that includes a main body portion having at least one outer edge surface and at least one adjoining surface, a portion of the at least one adjoining surface lying in a first plane, and the at least one insert having an engaging face disposed against the at least one outer edge surface and at least one reference surface adjacent the engaging face, the at least one reference surface lying in a second plane, wherein the at least one adjoining surface is adjacent the engaging face of the at least one insert and the first and second planes being parallel to and offset from one another.

In some embodiments, the at least one insert comprises two inserts, the at least one outer surface comprises two outer surfaces, the two outer surfaces disposed on opposite sides of the main body portion, and the at least one adjoining surface comprises two adjoining surfaces, wherein the two inserts are disposed on opposite sides of the main body portion.

In some embodiments, the at least one insert has an opening extending at least partially therethrough and a portion of the main body extends into the opening in the at least one insert to retain the at least one insert against the at least one outer edge surface.

In some embodiments, the main body has a central surface, the central surface being disposed adjacent to the at least one adjoining surface and on an opposite side of the at least one adjoining surface from the at least one outer edge surface, the central surface lying in a third plane, the third plane parallel to the first and second planes and offset from the first plane.

In another aspect, the invention is directed to an insert-molded fiber optic transmission component having at least one insert that includes a main body portion having at least one outer edge surface and at least two adjoining surfaces, a portion of a first of the at least two adjoining surfaces lying in a first plane and a portion of a second of the at least two adjoining surfaces lying in a second plane, and the at least one insert having an engaging face disposed against the at least one outer edge surface and at least two reference surfaces adjacent the engaging face, a first of the at least two reference surfaces lying in a third plane and a second of the at least two reference surfaces lying in a fourth plane, wherein the at least one adjoining surface is disposed adjacent the engaging face of the at least one insert and the first and third planes are parallel to and offset from one another and the second and fourth planes are parallel to and offset from one another, exposing a portion of the engaging face.

In yet another aspect, the invention is directed to an insert-molded fiber optic transmission component having at least one insert that includes a main body portion having at least one outer edge surface and a central body surface, the at least one outer edge surface having a top edge, and the at least one insert having an engaging face at least partially disposed against the at least one outer edge surface and at least one reference surface adjacent the engaging face and generally perpendicular thereto, wherein the top edge of the at least one outer edge surface is disposed below the at least one reference surface exposing at least a portion of the engaging face of the at least one insert.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Reference will now be made in detail to the present preferred embodiment(s) of the invention, examples of which are illustrated in the accompanying drawings. Whenever possible, the same reference numerals will be used throughout the drawings to refer to the same or like parts.

Figure 1:
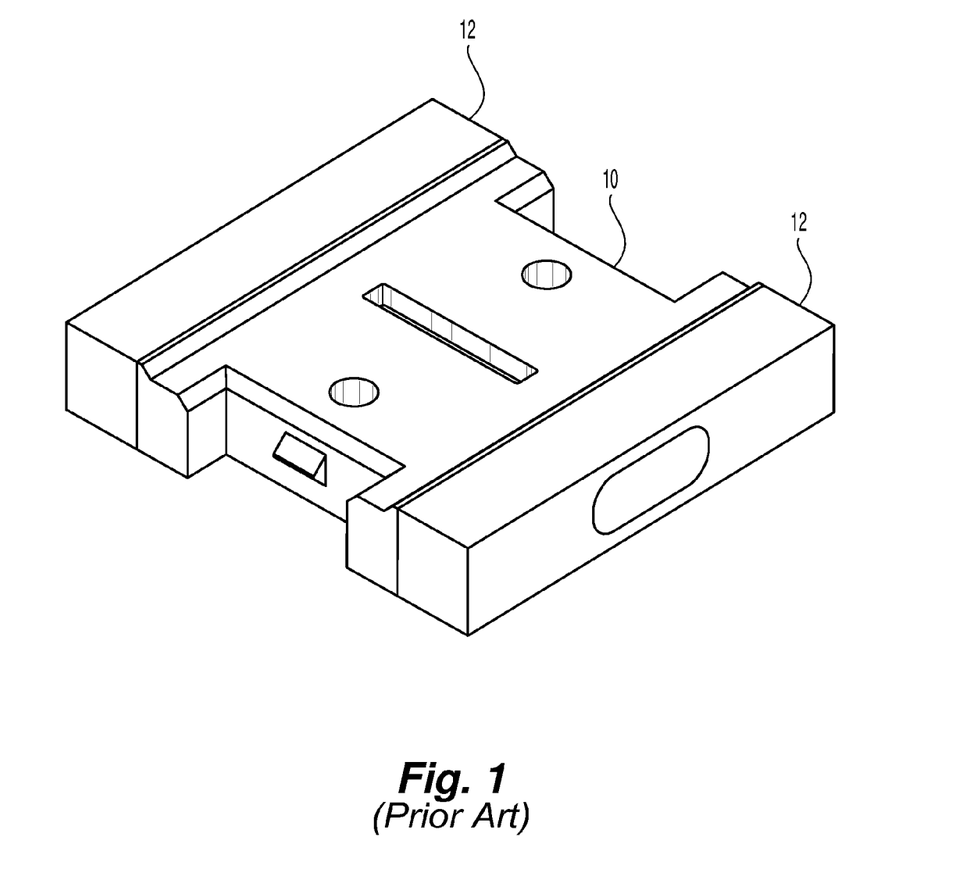
FIG. 1 is a top perspective view of a transceiver body with two heat sinks according to the prior art.
Figure 2:
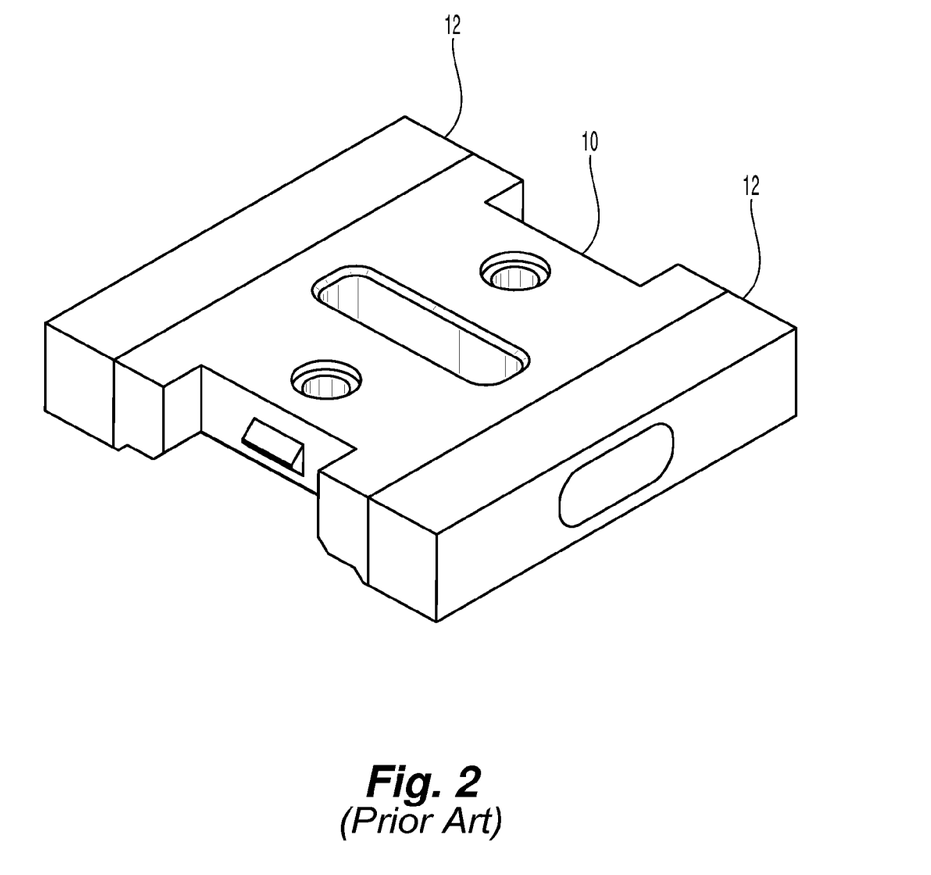
FIG. 2 is a bottom perspective view of the transceiver body of FIG. 1.
Figure 3:
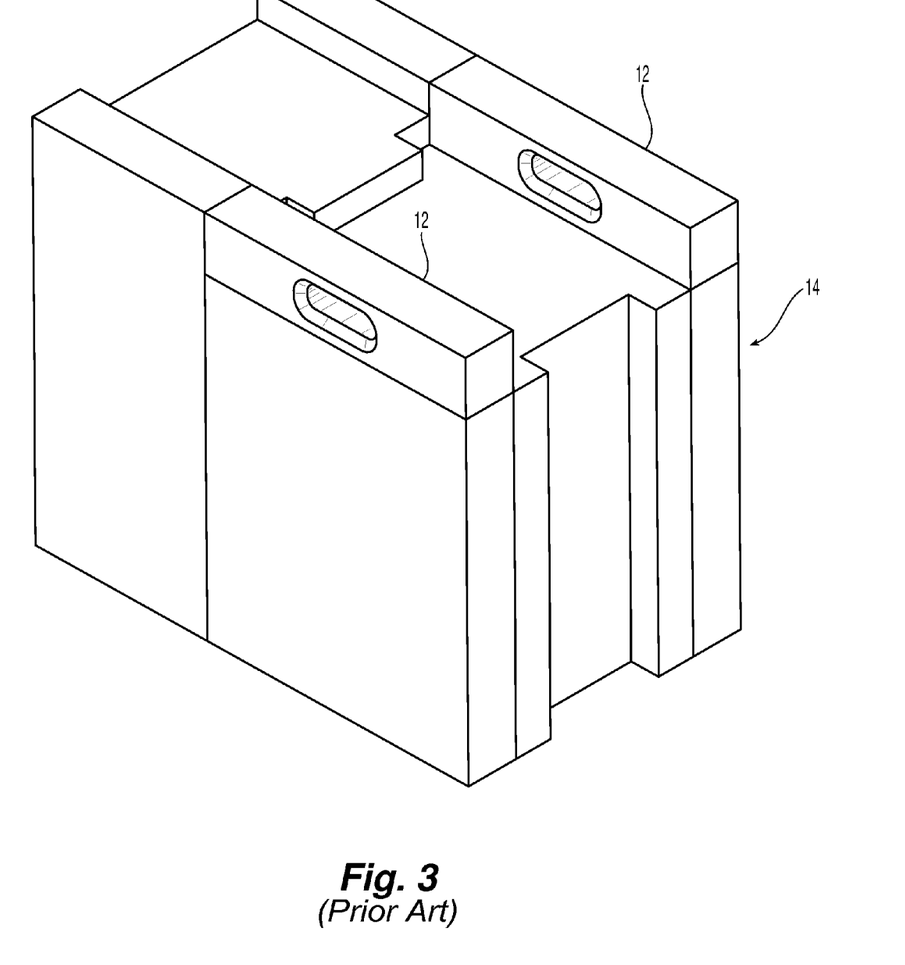
FIG. 3 is a perspective view of a portion of a mold for the transceiver body of FIG. 1 with the heat sinks positioned on the mold.
Figure 4:
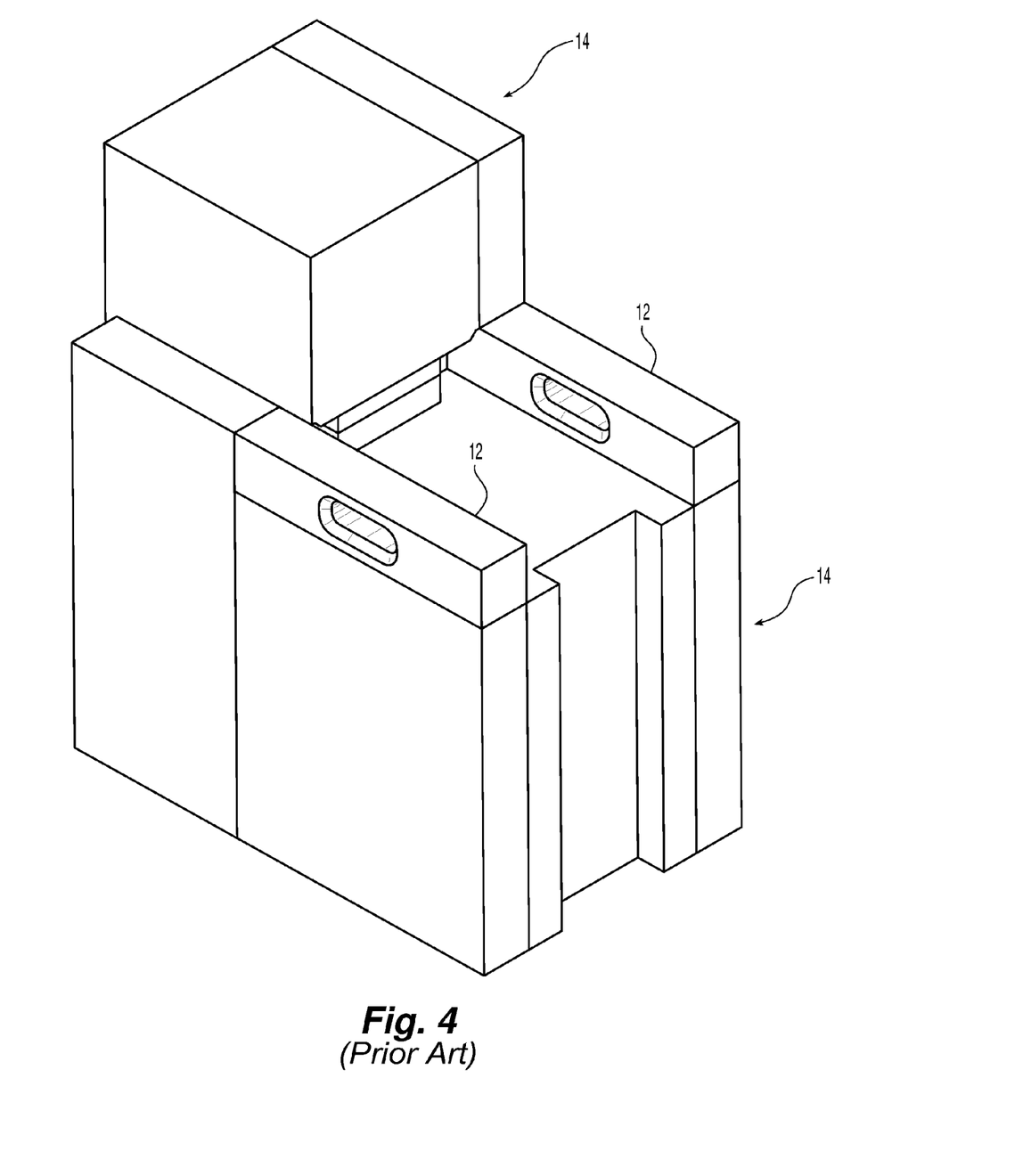
FIG. 4 is another portion of the mold of FIG. 3 illustrated relative to the heat sinks and transceiver body cavity.
Figure 5:
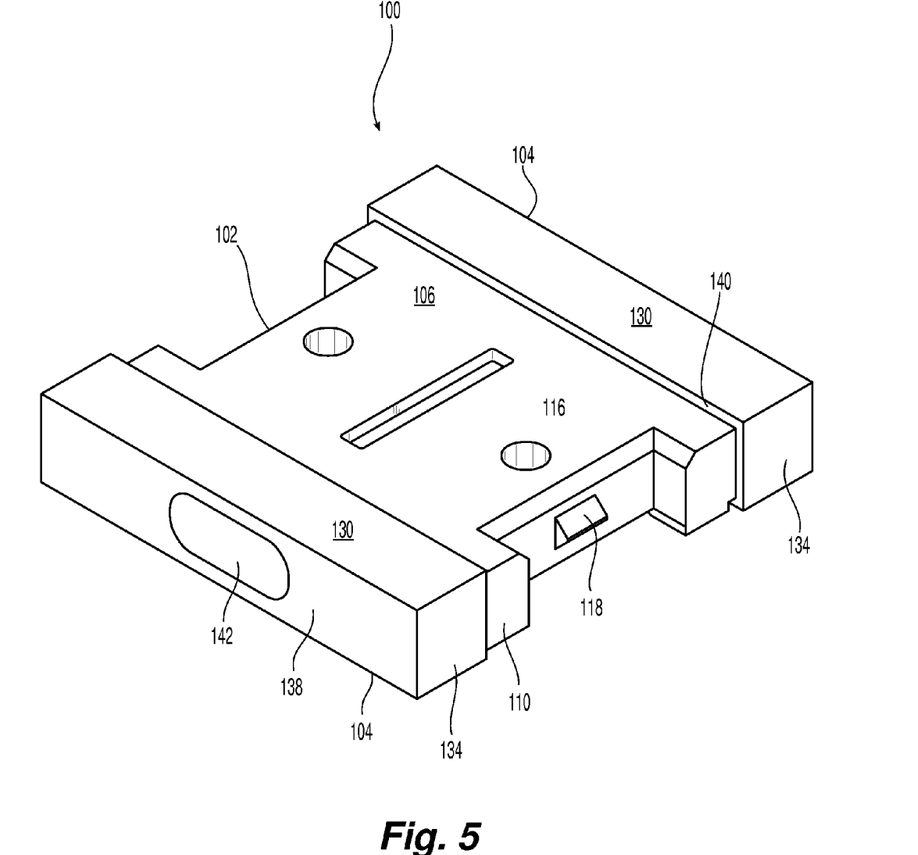
FIG. 5 is a top perspective view of one embodiment of a transceiver body with two heat sinks according to the present invention.
Figure 6:
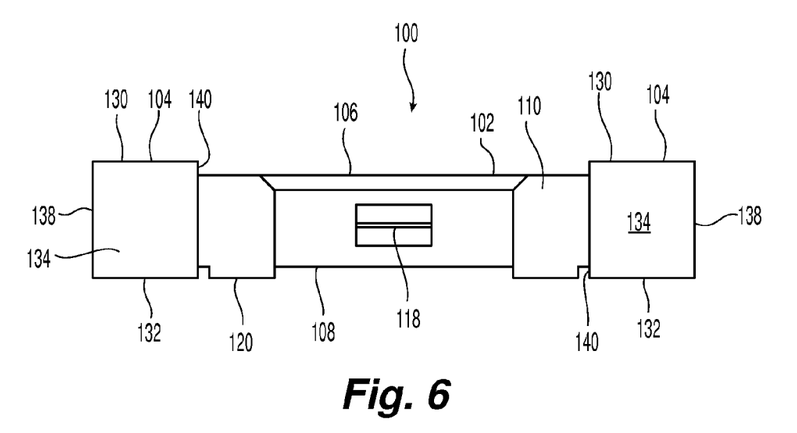
FIG. 6 is an front view of the transceiver body of FIG. 5.

One embodiment of the present invention is directed is a transceiver body that has two heat sinks injection-molded together. In the prior art, as illustrated in FIGS. 1 and 2, The transceiver body 10 is in the middle and has two heat sinks 12 on opposite sides. The bottom of the transceiver body 10 is illustrated in FIG. 2. Careful examination of the FIGS. 1-2, will reveal that there are four surfaces of the heat sinks 12 that have to match identically on each side of the transceiver body 10 or there will be problems with flash. Since the heat sinks 12 function as one side of the molded transceiver body 10, the mold must fit almost perfectly with each of the heat sinks 12 to prevent flash. FIGS. 3 and 4 illustrate the heat sinks 12 in a portion of a mold 14 used to make the transceiver body 10 of FIGS. 1 and 2. However, the heat sinks 12 have a relatively large tolerance (±0.01 mm) in their length and height. These tolerances are sufficiently large enough to cause flash problems as the mold 14 may not be able to seal correctly around the heat sinks 12 given the that the molds 14 are designed to align along each of the vertical and horizontal surfaces of the heat sink.

Referring to FIGS. 5-11, an insert-molded fiber optic transmission component 100, or a transceiver body, is illustrated as having a main body portion 102 and at least one insert 104. As illustrated, the transceiver body 100 has two inserts 104, which are illustrated as heat sinks in this embodiment, but the invention may apply to any insert-molded component. The main body portion 102 has a top surface 106, a bottom surface 108, a front surface 110, a back surface 112, and two outer edge surfaces 114. The main body portion 102 has other features that are relevant to the operation of the transceiver body (such as an opening 116, latches 118, pads 120) but are not relevant to the present invention and will not be discussed further.

The inserts 104, which are usually made of metal, ceramic, or another polymer or any other appropriate material, have a top surface 130, a bottom surface 132, a front surface 134, a back surface 136, an outside surface 138, and an inside surface 140 that engages the outer edge surface 114 of the main body portion 102. See FIG. 10. Each of the inserts 104 also preferably have an opening 142 that extends at least partially through the insert 104 between the outside surface 138 and the inside surface 140. In the embodiment illustrated in FIGS. 5-11, the opening 142 extends all the way through the insert 104 (see FIG. 9) and can even be used as a port for injecting the material (typically a polymer) into the mold to form the main body portion 102. The combination of the opening 142 and a portion of the main body 102 (or material used to make the main body 102) extending into the opening 142 functions to hold the inserts 104 on the main body 102 in a fixed relationship.

The insert-molded fiber optic transmission component 100 solves the problems noted above with respect to the flash as a result of the molding process because the area of the outer edge surface 114 of main body portion 102 making contact with the inside surface 140 of the insert 104 is smaller than the area of the inside surface 140, thereby exposing a portion of the inside surface 140 of the insert 104. In particular, see FIGS. 5, 9, and 10.

Figure 7:
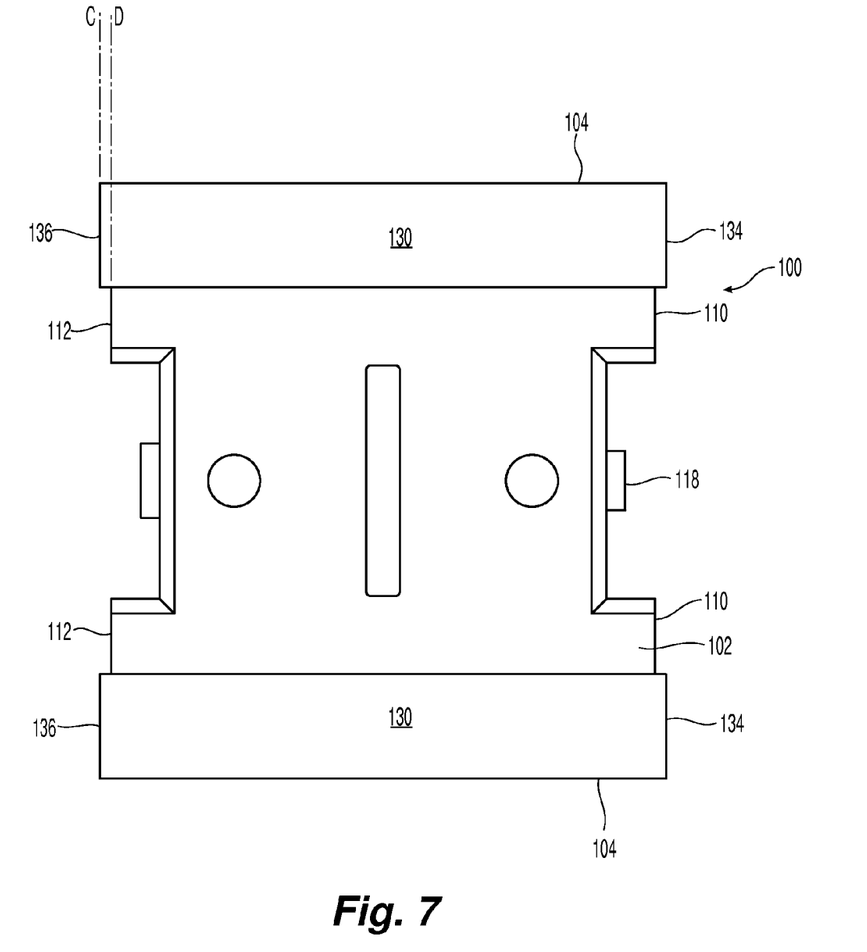
FIG. 7 is a top view of the transceiver body of FIG. 5.
Figure 8:
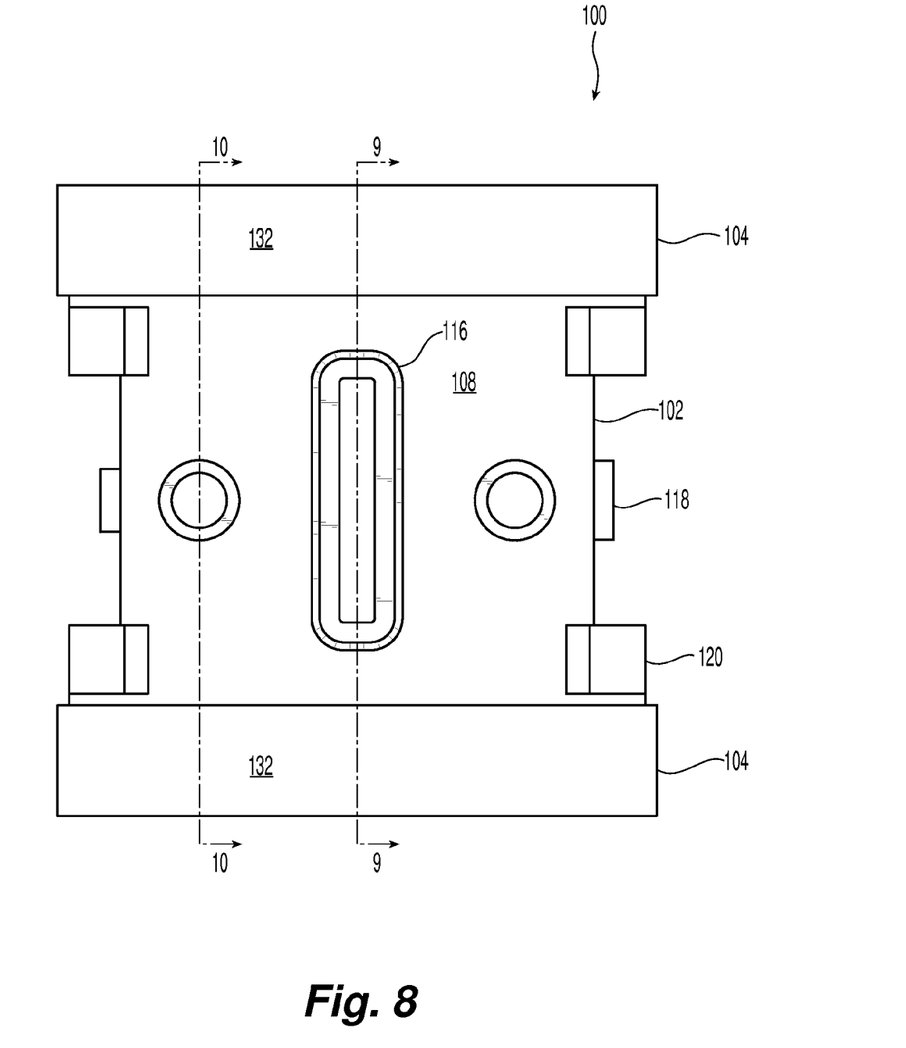
FIG. 8 is a bottom view of the transceiver body of FIG. 5.
Figure 9:
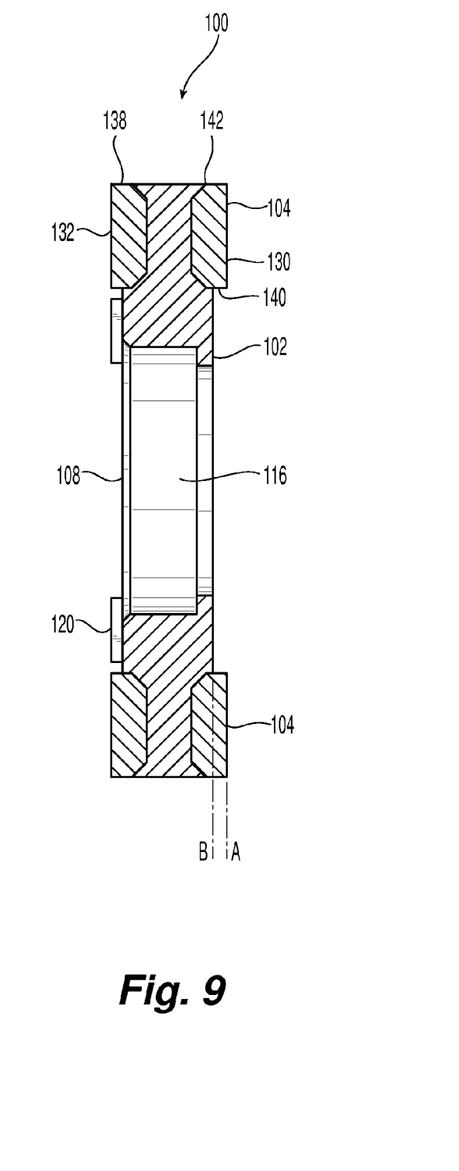
FIG. 9 is a cross section view of the assembly along the line 9-9 in FIG. 8.
Figure 10:
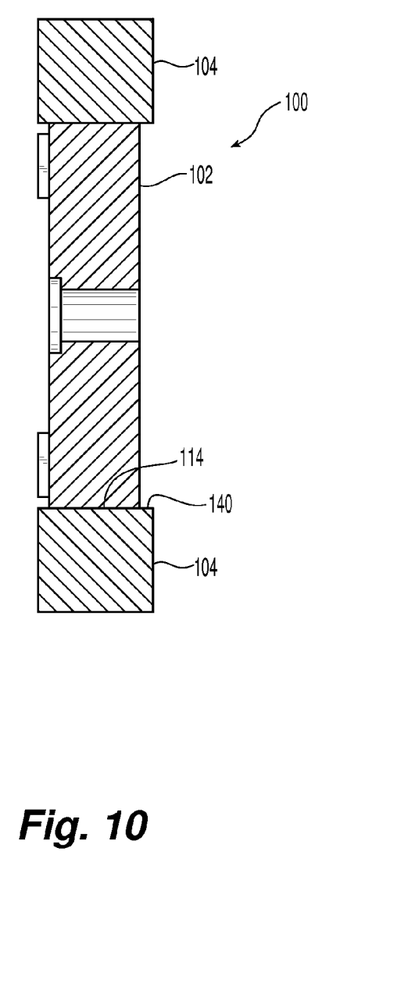
FIG. 10 is a cross section view of the assembly along the line 10-10 in FIG. 8
Figure 11:
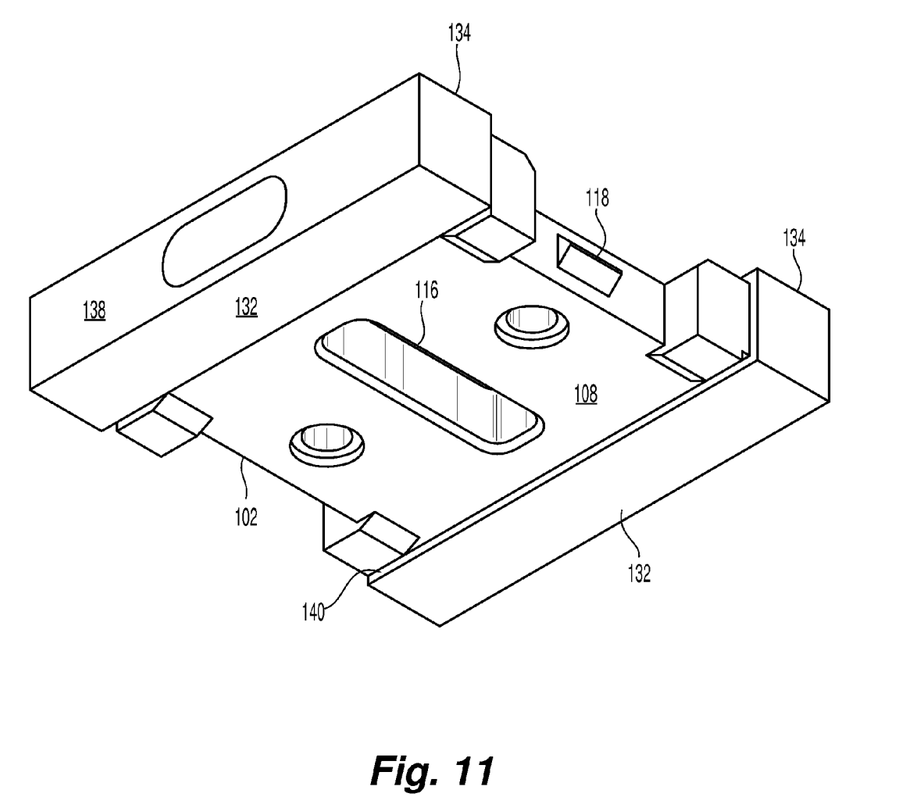
FIG. 11 is a bottom perspective view of the transceiver body of FIG. 5.

As further illustrated in FIG. 9, the top surface 130 of insert 104 is generally a flat surface and lies in a plane A. In this regard, the top surface 130 functions as a reference plane for the main body portion 102 and, in particular, for the main body portion 102 immediately adjacent the outer edge surface 114 and the inside surface 140 of the insert 104. The top surface 106 of the main body portion 102 immediately adjacent the outer edge surface 114 also lies in a plane B that is preferably parallel to, but offset by a distance from, the plane A. The same is also true with bottom surface 108 of main body portion 102 and a bottom surface 132 of insert 104. Referring now to FIG. 7, the back surface 136 of insert 104 lies in a plane C and the back surface 112 of the main body 102 adjacent the insert 104 lies in a plane D. Planes C and D are preferably parallel to but offset from one another, again exposing a portion of the inside surface 140 of the insert 104. The same spatial relationships are present at the front of the transceiver body 100 as can be seen in FIGS. 5, 7, 8, and 10.

Figure 12:
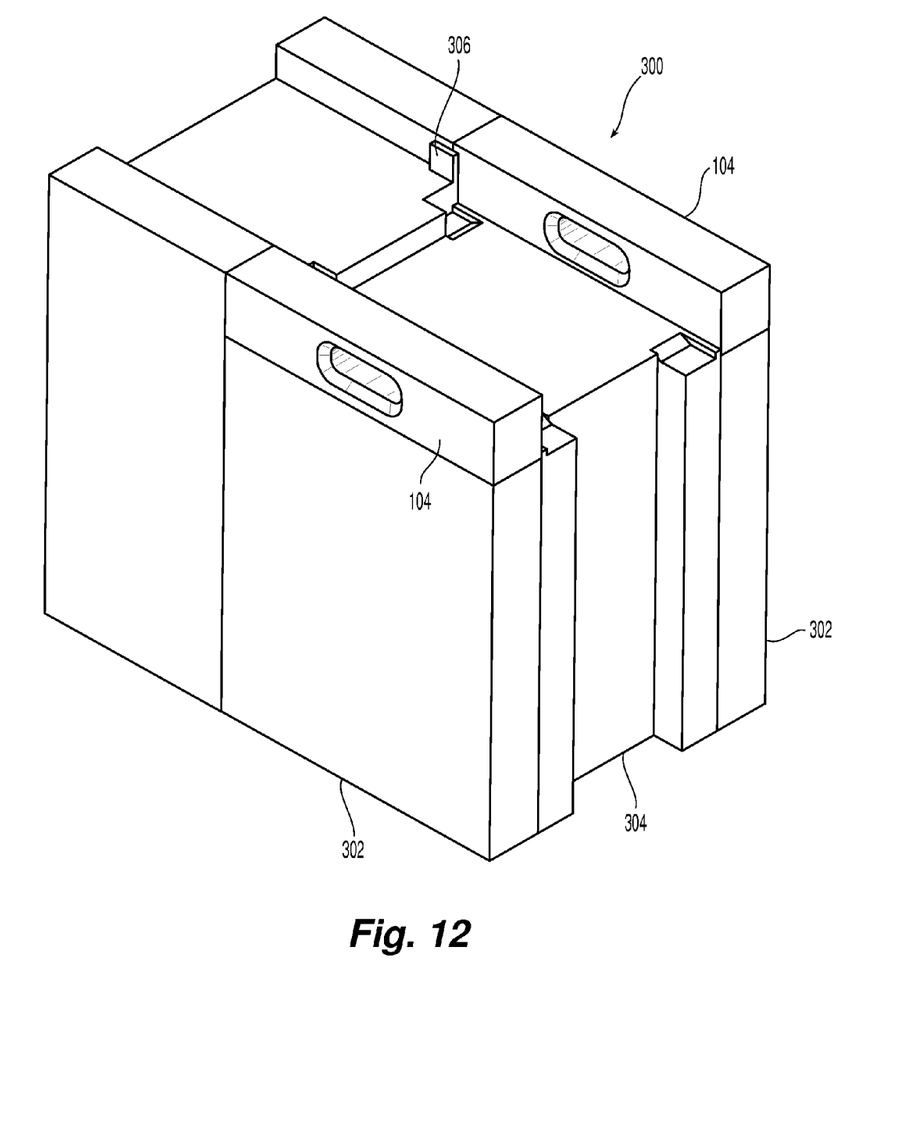
FIG. 12 is a perspective view of a portion of a mold to form the transceiver body of FIG. 5 with two heat sinks in place.
Figure 13:
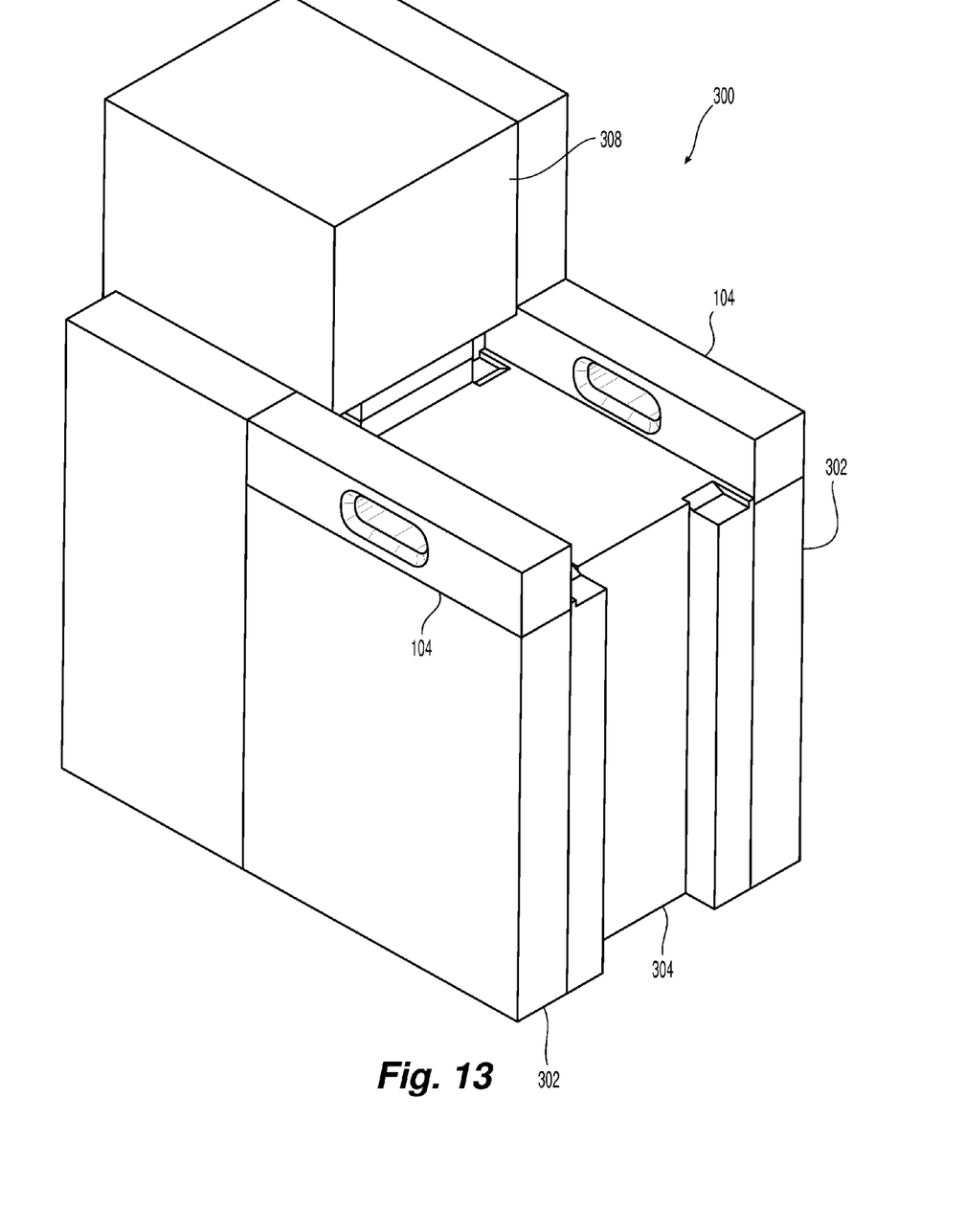
FIG. 13 is a perspective view of another portion of the mold of FIG. 12 illustrated relative to the heat sinks and transceiver body cavity.

A portion of a mold 300 to mold the fiber optic transmission component 100 is illustrated in FIGS. 12 and 13. The inserts 104 are disposed on portions 302, which surround a center portion 304 that molds the main body portion 102. The details of the fiber optic transmission component 100 are not illustrated in the mold figures for clarity. Additionally, not all parts of the mold are illustrated for clarity. It should be noted that the top of the center portion 304 is higher than the bottom of the inserts 104, which as noted above, allows for a portion of the inside surface 140 of the insert 104 to be visible and prevents flash around the long edges of the inserts 104. At the upper end of the mold portion 300 is a structure 306 that provides for the exposed portion of the inserts 104 at the front surface 134 and back surface 136. The size of the structure 306 and the difference in portions 302 and 304 are larger than the variations in the dimensions of the inserts 104, which ensures that the edges of the inserts 104 will be behind the mold portions and prevent flash formation. FIG. 13 illustrates a top portion 308 that, like portion 304, is disposed between the two inserts 104.

Figure 14:
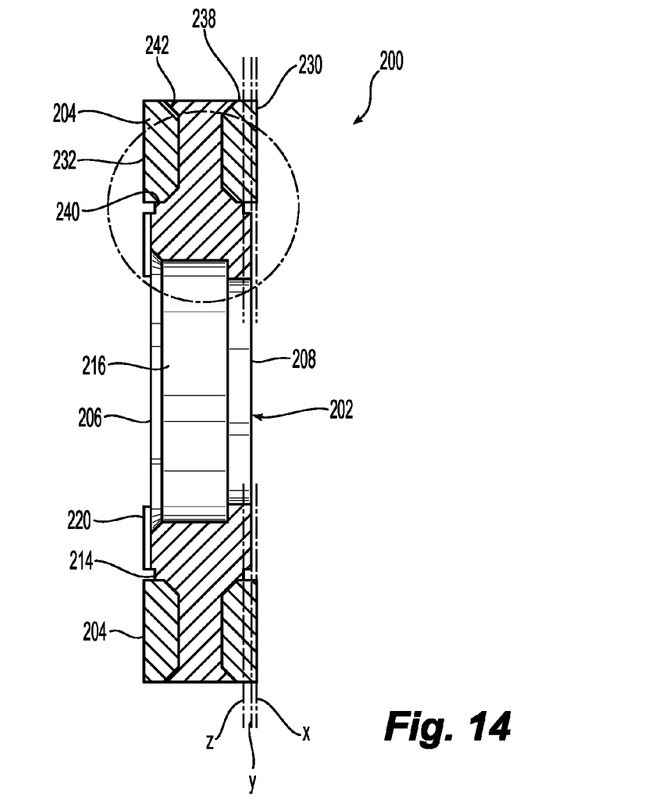
FIG. 14 is a is a cross section view of another embodiment of a transceiver body according to the present invention through a central part thereof.
Figure 15:
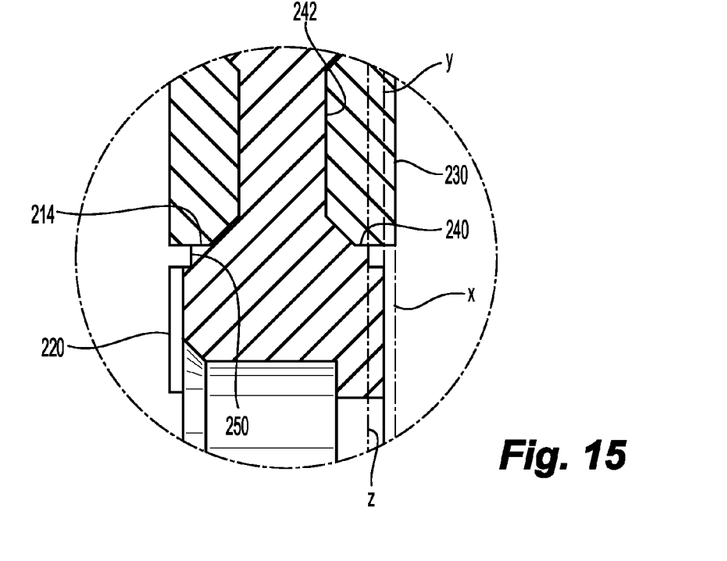
FIG. 15 is a detail view of a portion of the transceiver body of FIGS. 14.

Another embodiment of a insert-molded fiber optic transmission component 200, or a transceiver body, is illustrated in FIGS. 14 and 15 as having a main body portion 202 and at least one insert 204. As illustrated, the transceiver body 200 has two inserts 204, which are illustrated as heat sinks in this embodiment, but the invention may apply to any insert-molded component. The main body portion 202 has a top surface 206, a bottom surface 208, and two outer edge surfaces 214. The main body portion 202 has other features that are relevant to the operation of the transceiver body (such as an opening 216 and pads 220) but are not relevant to the present invention and will not be discussed further.

The inserts 204, which are usually made of metal, ceramic, or another polymer or any other appropriate material, have a top surface 230, a bottom surface 232, an outside surface 238 and an inside surface 240 that engages the outer edge surface 214 of the main body portion 202. See FIG. 15. Each of the inserts 204 also preferably has an opening 242 that extends at least partially through the insert 204 between the outside surface 238 and the inside surface 240. Preferably, the opening 242 extends all the way through the insert 204 and can even be used as a port for injecting the material (typically a polymer) into the mold to form the main body portion 202. The combination of the opening 242 and a portion of the main body 202 (or material used to make the main body 202) extending into the opening 242 functions to hold the inserts 204 on the main body portion 202 in a fixed relationship.

In this embodiment, the portion of the main body portion 202 adjacent the inserts 204 is smaller than in the previous embodiment and provides for a larger exposed portion of the inside surface 240 of the insert 204, as is more visible in FIG. 15. As can be in FIGS. 14 and 15, the top surface 230 of insert 204 is generally a flat surface and lies in a plane X. Thus, the top surface 230 functions as a reference plane for the transceiver body 200. The top surface 206 of the main body portion 202 lies in a second plane, plane Y, which is parallel to and offset from plane X. In this embodiment of transceiver body 200, the portion 250 of the main body 202 immediately adjacent the outer edge surface 214 is on a different plane, plane X, that is preferably parallel to, but offset by a distance from, the planes X and Y. It should be noted that planes X and Y may lie on the same plane, but X and Z should not be on the same plane. As is obvious to one of ordinary skill in the art, when planes Y and Z are the same, the embodiment will be substantially similar to the fiber optic transmission component 100.

Figure 16:
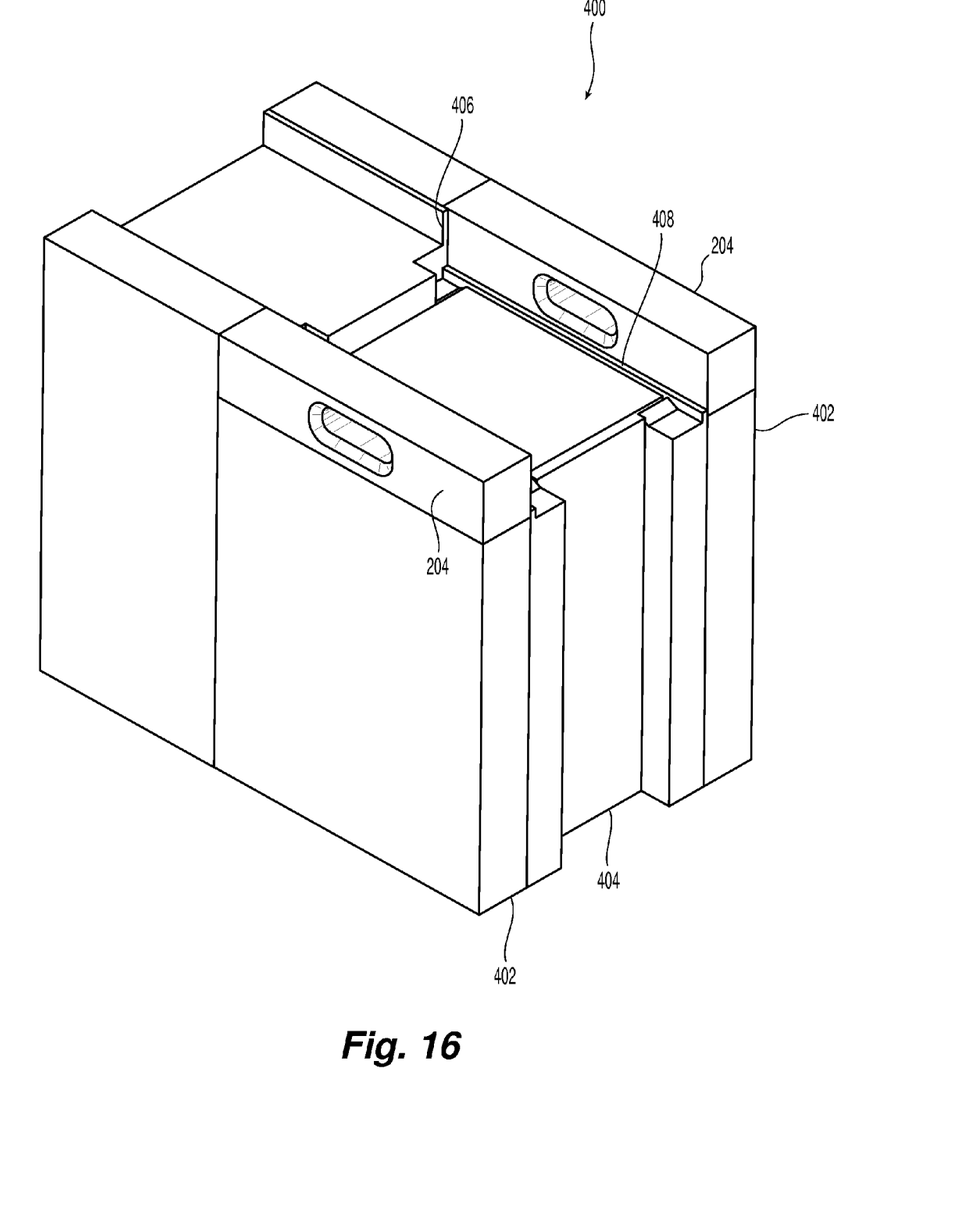
FIG. 16 is a perspective view of a portion of a mold for the transceiver body of FIG. 14.

FIG. illustrates a portion of a mold 400 to mold the fiber optic transmission component 200 is illustrated in FIG. 16. The inserts 204 are disposed on portions 402, which surround a center portion 404 that molds the main body portion 202. The details of the fiber optic transmission component 200 are not illustrated in the figures for mold 400 for clarity. Additionally, not all parts of the mold are illustrated for clarity. It should be noted that the top of the center portion 404 is higher than the bottom of the inserts 204, which as noted above, allows for a portion of the inside surface 240 of the insert 204 to be visible and prevents flash around the long edges of the inserts 204. In this mold, there is an extra portion 408 that extends upward along the inserts 204 and forms the portion 250 of the main body 202 immediately adjacent the outer edge surface 214. See FIG. 15. At the upper end of the mold portion 400 is a structure 406 that provides for the exposed portion of the inserts 204 at the front surface 234 and back surface 236. The size of the structure 406 and the difference in portions 402 and 404 are larger than the variations in the dimensions of the inserts 204, which ensures that the edges of the inserts 204 will be behind the mold portions and prevent flash formation.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. An insert-molded fiber optic transmission component having at least one insert molded therein comprising:
    a main body portion having at least one outer edge surface and at least one adjoining surface, a portion of the at least one adjoining surface lying in a first plane; and
    the at least one insert having an engaging face disposed directly against the at least one outer edge surface of the main body portion and at least one reference surface immediately adjacent the engaging face after insert-molding the main body portion to the at least one insert, the at least one reference surface lying in a second plane, wherein the at least one adjoining surface of the main body portion is adjacent the engaging face of the at least one insert and the first and second planes being parallel to and offset from one another.

2. The insert-molded fiber optic transmission component of claim 1, wherein the at least one insert comprises two inserts, the at least one outer surface comprises two outer surfaces, the two outer surfaces disposed on opposite sides of the main body portion, and the at least one adjoining surface comprises two adjoining surfaces, wherein the two inserts are disposed on opposite sides of the main body portion.

3. The insert-molded fiber optic transmission component of claim 1, wherein the fiber optic transmission component is a transceiver body.

4. The insert-molded fiber optic transmission component of claim 1, wherein the at least one insert has an opening extending at least partially therethrough and a portion of the main body extends into the opening in the at least one insert to retain the at least one insert against the at least one outer edge surface.

5. The insert-molded fiber optic transmission component of claim 4, wherein the opening in the at least one insert extends therethrough and is used as an injection point for molding the component.

6. The insert-molded fiber optic transmission component of claim 1, wherein the main body has a central surface, the central surface being disposed adjacent to the at least one adjoining surface and on an opposite side of the at least one adjoining surface from the at least one outer edge surface, the central surface lying in a third plane, the third plane parallel to the first and second planes and offset from the first plane.

7. An insert-molded fiber optic transmission component having at least one insert comprising:
    a main body portion having at least one outer edge surface and at least two adjoining surfaces, a portion of a first of the at least two adjoining surfaces lying in a first plane and a portion of a second of the at least two adjoining surfaces lying in a second plane; and
    the at least one insert having an engaging face disposed against the at least one outer edge surface and at least two reference surfaces adjacent the engaging face, a first of the at least two reference surfaces lying in a third plane and a second of the at least two reference surfaces lying in a fourth plane,
wherein the at least one adjoining surface is disposed adjacent the engaging face of the at least one insert and the first and third planes are parallel to and offset from one another and the second and fourth planes are parallel to and offset from one another, exposing a portion of the engaging face and the at least one insert has an opening extending at least partially therethrough and a portion of the main body extends into the opening in the at least one insert to retain the at least one insert against the at least one outer edge surface.

8. The insert-molded fiber optic transmission component of claim 7, wherein the main body has a central body surface, the central body surface lying in a fifth plane, the fifth plane being parallel to the first and third planes and offset from the from the first plane.

9. The insert-molded fiber optic transmission component of claim 7, wherein the opening in the at least one insert extends therethrough and is used as an injection point for molding the component.

10. An insert-molded fiber optic transmission component having at least one insert comprising:
a main body portion having at least one outer edge surface and a central body surface, the at least one outer edge surface having a top edge; and
the at least one insert having an engaging face at least partially disposed against the at least one outer edge surface and at least one reference surface adjacent the engaging face and generally perpendicular thereto,
wherein the top edge of the at least one outer edge surface is disposed below the at least one reference surface exposing at least a portion of the engaging face of the at least one insert and at least one insert has an opening extending at least partially therethrough and a portion of the main body extends into the opening in the at least one insert to retain the at least one insert against the at least one outer edge surface.

11. The insert-molded fiber optic transmission component of claim 10, wherein the top edge of the at least one outer edge surface is disposed below the central body surface.

12. The insert-molded fiber optic transmission component of claim 10, wherein the top edge of the at least one outer edge surface is disposed is above the central body surface.

13. The insert-molded fiber optic transmission component of claim 10, wherein the opening in the at least one insert extends therethrough and is used as an injection point for molding the component.

14. A method of insert-molding a fiber optic transmission component comprising the steps of:
providing at least one insert having an engaging face and at least one reference surface immediately adjacent the engaging face, the at least one reference surface lying in a plane in a mold;
injecting material into the mold with the at least one insert, the material making a main body portion having at least one outer edge surface disposed directly against the engaging face of the at least one insert and also having at least one adjoining surface, a portion of the at least one adjoining surface lying in a different plane from the plane of the reference surface; and
wherein the at least one adjoining surface of the main body portion is adjacent the engaging face of the at least one insert and the two planes being parallel to and offset from one another.

* * * * *